United States Patent
Im et al.

(10) Patent No.: US 7,601,462 B2
(45) Date of Patent: Oct. 13, 2009

(54) CATHODE ACTIVE MATERIAL FOR LITHIUM RECHARGEABLE BATTERY AND LITHIUM RECHARGEABLE BATTERY USING THE SAME

(75) Inventors: Dong-Min Im, Gweohoon-si (KR); Young-Min Choi, Osan-si (KR); Gue-Sung Kim, Yongin-si (KR); Hyo-Sug Lee, Suwon-si (KR); Jung-Joon Park, Cheonan-si (KR)

(73) Assignee: Samsung SDI Co., Ltd., Suwon (KR)

( * ) Notice: Subject to any disclaimer, the term of this patent is extended or adjusted under 35 U.S.C. 154(b) by 880 days.

(21) Appl. No.: 11/037,232

(22) Filed: Jan. 19, 2005

(65) Prior Publication Data

US 2005/0158625 A1    Jul. 21, 2005

(30) Foreign Application Priority Data

Jan. 19, 2004   (KR) ................ 10-2004-0003801

(51) Int. Cl.
H01M 4/48 (2006.01)
H01M 4/50 (2006.01)
H01M 4/52 (2006.01)
H01M 4/58 (2006.01)

(52) U.S. Cl. ............... 429/223; 429/224; 429/231.1; 429/231.3

(58) Field of Classification Search ............ 429/217, 429/232, 223, 224, 231.1, 231.3
See application file for complete search history.

(56) References Cited

U.S. PATENT DOCUMENTS

| | | | |
|---|---|---|---|
| 6,346,348 B1 | 2/2002 | Nakajima et al. | |
| 6,582,852 B1 | 6/2003 | Gao et al. | |
| 2002/0061442 A1* | 5/2002 | Yamaura | ............ 429/223 |
| 2003/0086863 A1* | 5/2003 | Noguchi et al. | ......... 429/223 X |
| 2003/0170540 A1* | 9/2003 | Ohzuku et al. | ........... 429/231.1 |

FOREIGN PATENT DOCUMENTS

| | | |
|---|---|---|
| EP | 1014461 | 6/2000 |
| EP | 1189296 | 3/2002 |
| EP | 1296391 | 3/2003 |
| EP | 1304752 | 4/2003 |
| JP | 05290832 | 11/1993 |
| JP | 06215800 | 8/1994 |
| JP | 10294100 | 11/1998 |
| JP | 11025972 | 1/1999 |
| JP | 11079750 | 3/1999 |
| JP | 2000188107 | 7/2000 |
| JP | 2001297764 | 10/2001 |
| JP | 2003068299 | 3/2003 |

OTHER PUBLICATIONS

Wang M. et al.; "Enthalpy of Formation of LiNiO2; LiCoO2 and their Solid Solution, LiNi1-xCoxO2" Solid State Ionics, North Holland Pub. Company Amsterdam, NL, vol. 166, No. 1-2, Jan. 15, 2004, pp. 167-173, XP004494029 ISSN: 0167-2738.
European Search Report dated Feb. 26, 2007.
Chinese Office Action dated Nov. 9, 2007.

* cited by examiner

Primary Examiner—Stephen J. Kalafut
(74) Attorney, Agent, or Firm—H.C. Park & Associates, PLC

(57) ABSTRACT

A cathode active material for a lithium rechargeable battery is provided. The cathode active material is used for a lithium rechargeable battery containing a cathode, an anode, and an electrolytic solution. The cathode active material is composed of 0.5% by weight or less carbonate ion ($CO_3^{2-}$) plus bicarbonate ion ($HCO_3^-$) and 0.1% by weight or less hydroxyl ion ($OH^-$). The swelling of lithium battery containing the cathode active material is substantially suppressed when is placed at 60° C. or more.

17 Claims, 1 Drawing Sheet

CATHODE ACTIVE MATERIAL FOR LITHIUM RECHARGEABLE BATTERY AND LITHIUM RECHARGEABLE BATTERY USING THE SAME

BACKGROUND OF THE INVENTION

This application claims the priority of Korean Patent Application No. 2004-3801, filed on Jan. 19, 2004 in the Korean Intellectual Property Office, the disclosure of which is incorporated herein in its entirety by reference.

1. Field of the Invention

The present invention relates to a cathode active material for a lithium rechargeable battery, and more particularly to a cathode active material for a lithium rechargeable battery which can reduce the expansion rate of batteries at high temperatures, and a lithium rechargeable battery using the same.

2. Description of the Related Art

The need for lightweight high performance portable electronic devices such as camcorders, mobile phones and laptop computers, increased the amount of research into batteries that are a power source for those devices. In particular, rechargeable lithium rechargeable batteries have 3 times the energy density per unit weight as Pb storage batteries, Ni—Cd batteries, Ni—H batteries, and Ni—Zn batteries. In addition, rechargeable lithium rechargeable batteries can be charged rapidly. These advantages make the extensive use of rechargeable lithium rechargeable batteries more promising hence, research and development of this technology is increasing.

In lithium rechargeable batteries, the cathode is composed of a composite oxide of lithium and transition metals, such as $LiCoO_2$, $LiNiO_2$, $LiMnO_2$, $LiMn_2O_4$, $LiFePO_4$, $LiNi_xCo_{1-x}O_2$, and $LiNi_{1-x-y}Co_xMn_yO_2$. The anode is composed of lithium metal, lithium metal alloy, carbon-based materials, or graphite-based materials. If the anode of a lithium battery is composed of a lithium metal or a lithium metal alloy, the battery is referred to as a lithium metal battery. If an anode of a lithium battery is composed of carbon-based materials the battery is referred to as a lithium-ion battery.

The cathode is insulated from the anode by a separator, which is interposed between the cathode and the anode. In addition, an electrolytic solution is used for the migration of lithium ions. The electrolytic solution, which is an ionic conductor, is prepared by dissolving a lithium salt in an organic solvent. The organic solvent is general by a mixture of an organic solvent having a high dielectric constant and an organic solvent having low viscosity. The organic solvent with a high dielectric constant consists of a cyclic carbonate, and the organic solvent having low viscosity consists of a linear carbonate.

A lithium rechargeable battery containing the organic electrolytic solution is sealed in a stainless steel container, a pouch made of aluminum or the like in order to prevent the leakage of the organic electrolytic solution. Therefore, the cathode, anode, separator, and organic electrolytic solution become hermetically sealed from the outside. Accordingly, if gas is generated in the battery, the pressure inside the battery increases and swelling occurs.

In general, the generation of gas is observed at the interface between the electrodes and the electrolytic solution. If the electrode where gas is produced is the anode, the gas is primarily generated during the manufacturing process. If the electrode where gas is produced is the cathode, gas may be generated when consumers finally use the battery. In particular, if the battery swells due to the generation of gas, electronic devices such as mobile phones powered by the battery can be damaged.

Gas can be generated at the interface between a cathode and an electrolytic solution for various reasons. An increase in temperature is the main cause for the gas generation in a battery and this phenomenon is more easily observed when the battery is charged. In particular, if mobile phones are placed inside automobiles, the surrounding temperature therein can increase to around 100° C. Even in this situation, batteries must retain their performance without swelling.

In order to solve this problem of swelling of batteries due to increased surrounding temperatures, Japanese Laid-open Publication No. 2001-297764 suggests a cathode active material in which the amount of carbonate no more than 0.15% by weight, and the concentration of water no more than 300 ppm. The patent suggests that the reason for limiting the amount of carbonate and the concentration of water lies in the following mechanism. First, carbonate, in particular, lithium carbonate may subject to thermal decomposition, producing $CO_2$, and water reacts with $LiPF_6$ to form HF. Then, the HF may induce gas generation by decomposing carbonate. However, in general, lithium carbonate decomposes at 1310° C. Therefore, it is certain that lithium carbonate is less likely to thermally decompose in lithium batteries. In addition, the suggestion that water reacts with $LiPF_6$ to form HF and that the HF induces the gas generation by decomposing carbonate again, cannot explain the phenomenon in which batteries at high temperatures are more easily observed to form gas when batteries are charged. Moreover, batteries still swell even in situations where the amount of carbonate and the concentration of water are controlled as described above.

SUMMARY OF THE INVENTION

The present invention provides a cathode active material capable of preventing the swelling of a lithium battery which sits at 60° C. or more.

The present invention also provides a lithium rechargeable battery using the cathode active material.

According to an aspect of the present invention, a cathode active material is provided which has a concentration of 0.5% by weight or less of carbonate ion ($CO_3^{2-}$) plus bicarbonate ion ($HCO_3^-$) and 0.1% by weight or less of hydroxyl ion ($OH^-$).

According to another aspect of the present invention, there is provided a lithium rechargeable battery including: a cathode, which contains a cathode active material according to the present invention; an anode capable of intercalating and deintercalating lithium ions; a separator interposed between the cathode and the anode; and an organic electrolytic solution containing a lithium salt and an organic solvent.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
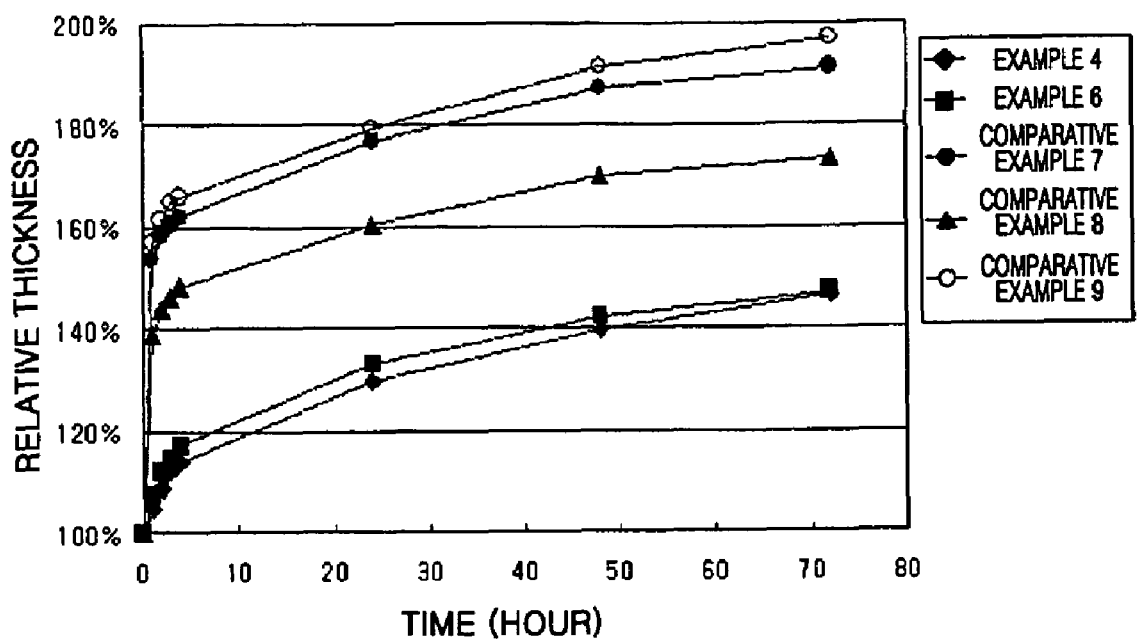
FIG. 1 illustrates the expansion rates of lithium rechargeable batteries according to Examples 4 and 6 and Comparative Examples 7 through 9.

A cathode active material for a lithium rechargeable battery according to embodiments of the present invention is a composite oxide of lithium and transition metals in which the carbonate ion plus bicarbonate ion concentration is at most 0.5% by weight and the concentration of hydroxyl ion is at most 0.1% by weight. The carbonate ion, bicarbonate ion, and hydroxyl ion exist, mainly on the surface of active material particles but are not limited thereto.

The carbonate ion, bicarbonate ion, and hydroxyl ion may exist in the forms of a lithium salt, transition-metal salt, or a composite salt including both the lithium and the transition-metal, or may exist each independently on the surface of the composite oxide of lithium and the transition metal by ionic bonding. In addition, these salts may be crystalline or amorphous and may not be identified by for example, X-ray diffraction (XRD).

Generally, the carbonate ion, bicarbonate ion and hydroxyl ion can be produced from reactants which form the cathode active material. They can also be generated when the active material absorbs water or $CO_2$ from the air, during a powder treatment process after heating and cooling treatments.

It is preferable that the weight fractions of the carbonate bicarbonate and hydroxyl ions are almost zero, but it is impossible to completely remove all of them. However, if a battery contains an active material in which the sum of the carbonate and bicarbonate ions is at most 0.5% by weight and the amount of the hydroxyl ion is at most 0.1% by weight, the expansion rate of the thickness of the battery may be maintained at 25% or less even when the battery is placed at 85° C. for 4 hours. Accordingly, the battery can be used in portable electronic devices without problems. Such benefits are obtained by using a common rectangular lithium-ion battery containing an electrolytic solution. However, if at least one of the weight percents of the ions falls outside of the desirable range, the expansion rate of the thickness exceeds the 25% and is unfavorable for use in portable electronic devices.

Any composite oxide of lithium and transition metals that is commonly used in lithium batteries can be used in a cathode active material according to embodiments of the present invention. Examples of the composite oxide may include, but are not limited to, $Li_xMn_{1-y}M'_yA_2$, $Li_xMn_{1-y}M'_yO_{2-z}X_z$, $Li_xMn_2O_{4-z}X_z$, $Li_xMn_{2-y}M'_yA_4$, $Li_xCo_{1-y}M'_yA_2$, $Li_xCo_{1-y}M'_yO_{2-z}X_z$, $Li_xNi_{1-y}M'_yA_2$, $Li_xNi_{1-y}M'_yO_{2-z}X_z$, $Li_xNi_{1-y}Co_yO_{2-z}X_z$, $Li_xNi_{1-y-z}Co_yM'_zA_\alpha$, $Li_xNi_{1-y-z}Co_yM'_zO_{2-\alpha}X_\alpha$, $Li_xNi_{1-y-z}Mn_yM'_zA_\alpha$, and $Li_xNi_{1-y-z}Mn_yM'_zO_{2-\alpha}X_\alpha$ where $0.95 \leq x \leq 1.1$, $0 \leq y \leq 0.5$, $0 \leq z \leq 0.5$, $0 < \alpha \leq 2$, M' may include, but is not limited to Al, Ni, Co, Mn, Cr, Fe, Mg, Sr, V, and a rare earth element, A may include but is not limited to O, F, S and P, and X may include but is not limited to F, S and P. These composite oxides are common in that they necessarily include lithium metal, oxygen, and further a transition metal such as Ni, Co, Mn, Fe, and the like.

In general, the assumption that the battery swelling occurs due to oxidation reactions at the cathode can be supported by two facts. First, a charged battery swells primarily at high temperatures when compared with a discharged battery. Second, the voltage drops gradually at the cathode while the battery swells at high temperatures which indirectly implies that oxidation reactions are occuring at the cathode. When anionic components on the surface of a common cathode active material are analyzed by, for example, ion chromatography or acid-base titration, carbonate, hydroxyl and sulfate ions are observed. Lithium salts containing carbonate, hydroxyl, or sulfate ions are analyzed by quantum mechanics to measure the energy levels of their HOMO states (relative value with respect to Li metal). The results are shown in Table 1:

TABLE 1

| Material Name | HOMO Level (eV) vs. Li metal |
| --- | --- |
| Hydroxyl lithium (LiOH) | −4.89 |
| Lithium carbonate ($Li_2CO_3$) | −5.57 |
| Ethylene carbonate | −6.35 |
| Lithium sulfate ($Li_2SO_4$) | −6.54 |

As shown in Table 1, a hydroxyl ion is the most likely to be oxidized, followed by a carbonate ion. A sulfate ion is less likely to be oxidized than ethylene carbonate, which is one of the main components of a common electrolytic solution. Accordingly, it is expected that if a cathode contains a hydroxyl ion and a carbonate ion, those ions are oxidized at lower voltages than an electrolytic solution.

After both the hydroxyl ion and the carbonate ion are oxidized in a gas generating process, the reaction mechanism of the hydroxyl ion can be explained by Reaction Scheme 1 based on quantum mechanics and general principles of chemistry.

Reaction Scheme 1

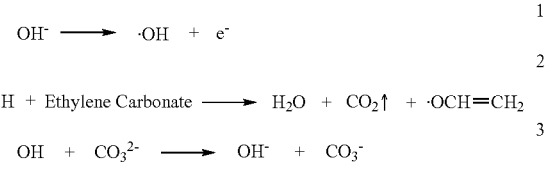

The hydroxyl ion loses one electron to form a hydroxyl radical (.OH) as shown in Formula 1. The hydroxyl radical gains hydrogen from ethylene carbonate, one of the main components of the electrolytic solution, to produce water and decomposes ethylene carbonate to form $CO_2$ as shown in Formula 2. However, the hydroxyl radical can gain hydrogen from other components of an electrolytic solution, instead of ethylene carbonate, and gain an electron from a adjacent carbonate ion to form a radical as shown in Formula 3. That is, the hydroxyl ion may act as a catalyst in a reaction in which a carbonate ion is oxidized.

If the temperature increases, the rates of the reactions are expected to increase. In particular, the reaction represented by Formula 2 may speed up, which can be explained by the following assumption. After ethylene carbonate loses hydrogen, it can react with another radical to form a stable compound at low temperature before the decomposition reaction occurs as shown in Formula 2. Therefore, when the temperature increases, $CO_2$ generation is increased.

In addition, a reaction mechanism of the carbonate ion can be explained by Reaction Scheme 2.

Reaction Scheme 2

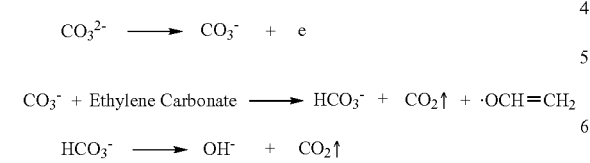

The carbonate ion loses an electron to form a carbonate radical ($CO_3^-$.) as shown in Formula 4. The carbonate radical gains hydrogen from ethylene carbonate, one of the main components of the electrolytic solution, to form a bicarbonate ion which then decomposes ethylene carbonate to produce $CO_2$ as shown in Formula 5. Note that, the carbonate radical can gain hydrogen from other components of the electrolytic solution instead of ethylene carbonate (reaction not shown). The bicarbonate ion is thermally unstable to decompose into $CO_2$ and a hydroxyl ion by itself, as shown in Formula 6.

Even though the bicarbonate ion is formed from the carbonate radical as shown in Formula 5, it can also be observed in a cathode active material before a battery is manufactured according to Formulas 7 and 8 below. In this case, $CO_2$ is generated without oxidation reactions which induces swelling of the battery.

$$Li_2CO_3 + H_2O \rightarrow LiHCO_3 + LiOH \qquad 7$$

$$LiOH + CO_2 \rightarrow LiHCO_3 \qquad 8$$

In summary, a hydroxyl ion and a carbonate ion are oxidized at the cathode to form radicals. The radicals in turn decompose an electrolytic solution to produce $CO_2$ according to a mechanism in which the radicals gain hydrogen from components of an electrolytic solution, thus swelling the battery. Therefore, the battery swelling can be decreased by maintaining the amounts of the carbonate, bicarbonate, and hydroxyl ions at low levels.

The cathode active material according to the present invention can be manufactured by various methods including the following example.

In conventional cases, hydroxides, metal salts, or metal oxides having a spinel structure are used as precursors to manufacture a cathode active material. Examples of the precursors may include $Ni(OH)_2$, $Co(CO_3)_2$, and $Co_3O_4$, for example. In the present invention, the cathode active material is prepared using a precursor having a rock-salt structure, such as CoO and NiO. In detail, in order to prepare $LiCoO_2$, LiOH (or $Li_2CO_3$) and CoO are mixed at an equivalent ratio. Then, the mixture is subject to a heat treatment of 800-1000° C. to obtain an active material, wherein the sum of the carbonate bicarbonate ions is at most 0.5% by weight and the amount of the hydroxyl ion is at most 0.1% by weight.

Hereinafter, a method of assembling a lithium battery according to an embodiment of the present invention will be described.

First, a cathode active material, conductor, binder, and solvent are mixed to prepare a cathode active material composition. The cathode active material composition is directly coated on an aluminium current collector, and then dried to form a cathode plate. Alternately, the cathode active material composition can be cast onto a separated support, and detached from the separated support, and then laminated on an aluminium-current collector, thereby forming a cathode plate.

Any cathode active material that is commonly used in lithium batteries can be used in the present embodiment. Examples of the cathode active material may include, but are not limited to, $Li_xMn_{1-y}M'_yA_2$, $Li_xMn_{1-y}M'_yO_{2-z}X_z$,   $O_{2-\alpha}X_\alpha$, $Li_xNi_{1-y-z}Mn_yM'_zA_\alpha$, and $Li_xNi_{1-y-z}Mn_yM'_zO_{2-\alpha}X_\alpha$ where $0.95 \leq x \leq 1.1$, $0 \leq y \leq 0.5$, $0 \leq z \leq 0.5$, $0 < \alpha \leq 2$, M' may include, but is not limited to, Al, Ni, Co, Mn, Cr, Fe, Mg, Sr, V and a rare earth element, A may include, but is not limited to, O, F, S and P, and X is one of F, S and P. The cathode active material contains 0.5% by weight of carbonate plus bicarbonate ions, and 0.1% by weight of hydroxyl ion based on the total weight of the cathode active material.

The conductor may include, for example, carbon black, acetylene black, Ketjen black, or the like. Any binder that is commonly used in lithium batteries can be used in the present embodiment. Examples of the binder may include vinylidenefluoride/hexafluoropropylene copolymer, polyvinylidenefluoride, polyacrylonitirile, polymethylmethacrylate, polytetrafluoroethylene, a mixture thereof, and a styrene butadiene rubber (SBR) for example. The solvent may be N-methylpyrrolidone (NMP), acetone, water, or the like. In the present embodiment, amounts of the cathode active material, the conductor, the binder, and the solvent are the same as those used in conventional methods of manufacturing lithium rechargeable batteries.

The process for manufacturing an anode plate is the same as that for the cathode electrode plate. An anode active material, conductor, solvent, and a binder are mixed to prepare an anode active material composition. A copper-current collector is directly coated with the anode active material composition to obtain an anode plate. Alternatively, the anode active material composition can be cast onto a separated support, detached from the separated support and then laminated on a copper-current collector, thereby forming an anode plate. The anode active material may include, but is not limited to, lithium metal, lithium alloy, carbonaceous materials, graphite, or the like. An anode active material composition includes the same conductor, binder, and solvent as used in the manufacturing process for the cathode active material composition. If needed, a plasticizer which is used to form pores inside an electrode plate is added to the cathode active material composition or to the anode active material composition.

Any separator used in common lithium batteries can be used in the present embodiment. In particular, a separator may have low resistance to the migration of ions in an electrolyte, but have an excellent electrolyte-retaining ability. Specific examples of the separator include glass fiber, polyester, polyethylene, polypropylene, polytetrafluoroethylene (PTFE), and a combination thereof, a material which can be rolled, which may be in non-woven or woven fabric form. In particular, a separator composed of including, but not limited to, polyethylene, polypropylene or the like can be used for a lithium ion battery. A separator that can retain a large amount of an organic electrolytic solution may be used for a lithium-ion polymer battery. A method of forming these separators will now be described.

A polymer resin, a filler, and a solvent are mixed to prepare a separator composition. The separator composition is directly coated on an electrode, and then dried to form a separator film. Alternatively, the separator composition can be cast onto a separated support, dried, detached from the separated support, and finally laminated on an upper portion of an electrode, thereby forming a separator film.

Any polymer resin can be used in the present embodiment. Examples of the polymer resin may include, but are not limited to, vinylidenefluoride/hexafluoropropylene copolymer, polyvinylidenefluoride, polyacrylonitrile, polymethylmethacrylate and a mixture thereof. In particular, the polymer resin may be a vinylidenefluoride/hexafluoropropylene copolymer, in which the amount of hexafluoropropylene is in the range of 8-25% by weight.

The separator is interposed between the cathode plate and the anode plate to form the electrode assembly. The electrode assembly is wound or folded and then sealed in a cylindrical or rectangular battery case. The non-aqueous electrolytic solution is injected into the battery case to complete a lithium battery. Alternatively, the electrode assemblies may be stacked upon one another to form a bi-cell structure, immersed in a non-aqueous electrolytic solution, and sealed in a pouch to form a lithium battery.

The non-aqueous electrolytic solution may be prepared by dissolving a lithium salt 0.5-1.5M in an organic solvent. Any lithium salt that is commonly used in the art can be used in the present embodiment. Examples of the lithium salt may include $LiPF_6$, $LiClO_4$, $LiBF_4$, $LiBF_6$, $LiCF_3SO_3$, $LiAsF_6$, $LiC_4F_9SO_3$, $LiN(SO_2CF_3)_2$, $LiN(SO_2C_2F_5)_2$, $LiSbF_6$ and a mixture thereof, for example.

Any organic solvent that is commonly used in the art can be used in the present embodiments. Examples of the organic solvent may include, but are not limited to, ethylene carbonate, propylene carbonate, dimethyl carbonate, diethyl carbonate, ethylmethyl carbonate, methylpropyl carbonate, ethylpropyl carbonate, methylbutyl carbonate, tetrahydrofuran, 2-methyltetrahydrofuran, diethoxyethane, methylformate, ethylformate, triglyme, tetraglyme, fluorobenzene, difluorobenzene, γ-butyrolactone, acetone, acetonitrile, n-methyl-2-pyrrolidone, the mixture thereof, and the like. In general, the organic solvent is a mixed solution composed of one organic solvent with a high dielectric constant and the other having low viscosity. For example, in batteries containing non-graphite based carbon as an anode active material, the organic solvent may be a mixed solvent of propylene carbonate, diethyl carbonate or dimethyl carbonate. For such a battery, the organic solvent having a high dielectric constant is propylene carbonate and the low viscosity organic solvent is diethyl carbonate or dimethyl carbonate. In batteries containing graphite-based carbon as an anode active material, the organic solution may be a mixed solvent of ethylene carbonate, and diethyl carbonate or dimethyl carbonate. For that type of battery, ethylene carbonate is to the organic solvent with a high dielectric constant and diethyl carbonate or dimethyl carbonate are the low viscosity organic solvent.

The present invention will be described in greater detail with reference to the following examples. The following examples are for illustrative purposes and are not intended to limit the scope of the invention.

EXAMPLES 1-6

Example 1

Preparation of Cathode Active Material

CoO powder which is commercially available and has an average particle size of 12 μm was prepared. The CoO powder and LiOH were mixed to form a mixture of Co and lithium in a mole ratio of 1:1. The mixture was heated at 850° C. for 15 hours to prepare $LiCoO_2$ (powder). The $LiCoO_2$ powder was dried under a vacuum atmosphere before being used in the manufacture of a battery, to control the amount of water therein to 200 ppm or less.

(Hereinafter, in all Examples and Comparative Examples, the powders were prepared to have the amount of water of 200 ppm or less.)

The cathode active material powder ($LiCoO_2$) was washed with a triply distilled water, and then titrated with 0.1M HCl to measure the amounts of carbonate ion, bicarbonate ion, and hydroxyl ion (Reference: G. H. Jeffery, J. Bassett, J. Mendham, R. C. Denney, "Vogel's textbook of quantitative chemical analysis, 5th Ed.", p. 297, Longman, Essex (1989)). In order to measure the amount of sulfate, the cathode active material powder ($LiCoO_2$) was analyzed by the ion chromatography. In the cathode active material, the carbonate plus bicarbonate ion condensation was 0.153% by weight, 0.055% by weight (of the hydroxyl ion), and 0.049% by weight (of the sulfate ion) based on the total weight of the cathode active material.

Example 2

Preparation of Cathode Active Material $Ni_{0.8}Co_{0.2}(OH)_2$, which has an average particle size of 12 μm and an assembled structure, was prepared by a coprecipitation method. $Ni_{0.8}Co_{0.2}(OH)_2$ was heated at 800° C. for 15 hours to form $Ni_{0.8}Co_{0.2}O$. The $Ni_{0.8}Co_{0.2}O$ was mixed with LiOH to prepare a mixture of a transition metal and lithium in a mole ratio of 1:1. The mixture was heated at 800° C. for 15 hours to form $LiNi_{0.8}Co_{0.2}O_2$ (cathode active material). In the cathode active material, carbonate plus bicarbonate ion fraction was 0.250% by weight and the fraction of hydroxyl ion was 0.033% by weight based on the total weight of the cathode active material.

Example 3

Preparation of Cathode Active Material $LiCoO_2$ powder prepared in Example 1 and $Li_2SO_4$ were mixed in a weight ratio of 100:1. The resulting mixture was pulverized and mixed in a mortar under dry conditions to prepare a cathode active material. The cathode active material was 0.144% by weight carbonate plus bicarbonate ion concentration, 0.064% by weight (of a hydroxyl ion), and 0.847% by weight (of sulfate ion) based on the total weight of the cathode active material.

Example 4

Construction of Lithium Battery (1) Preparation of Cathode

A mixture of 96% by weight of the cathode active material as prepared in Example 1, 2% by weight of PVDF as a binder, and 2% by weight of a carbon conductor was prepared. The addition of the carbon conductor facilitates the migration of electrons. Then, the mixture 100 mL of N-methyl-pyrrolidone (NMP) and ceramic balls were added and stirred for 10 hours in a 200 mL plastic bottle. The resulting mixture was cast onto a 15 μm-thick aluminum foil by a 250 μm-spaced doctor blade, dried in an oven at about 110° C. for about 12 hours to completely evaporate the NMP, roll-pressed, and finally cut to a predetermined size to form a cathode plate with a thickness of 95 μm.

(2) Preparation of Anode

A mixture of 96% by weight of graphite-based powder as an anode active material and 4% by weight of PVDF as a binder was combined with NMP and ceramic balls and stirred for about 10 hours. The resulting mixture cast onto a 19 μm-thick copper foil by a 300 μm-spaced doctor blade, dried in an oven at about 90° C. for about 10 hours to fully evaporate the NMP, roll-pressed, and finally cut to a predetermined size to form an anode plate with a thickness of 120 μm.

(3) Assembly of Battery

A 20 μm-thick polyethylene/polypropylene multi-porous membrane (available from Hoest Cellanese, U.S.A.) was used as a separator. The separator was interposed between the cathode and the anode plates and rolled into a jelly-roll electrode assembly. The electrode assembly was placed in a rectangular aluminum battery case, which was then injected with a non-aqueous electrolytic solution and finally sealed to form an 820-mAh lithium rechargeable battery having a thickness of 4.5 mm. The non-aqueous electrolytic solution was prepared by dissolving 1.1 M $LiPF_6$ in 2.7 g of an organic solvent mixture of ethylene carbonate (EC), ethyl methyl carbonate (EMC), propylene carbonate(PC), and dimethyl carbonate (DMC) in a ratio of 30:55:5:10 by volume.

Example 5

A lithium battery was assembled in the same manner as in Example 4, except that the cathode active material prepared in Example 2 was used instead of the cathode active material manufactured in Example 1.

Example 6

A lithium battery was assembled in the same manner as in Example 4, except that the cathode active material manufactured in Example 3 was used instead of the cathode active material manufactured in Example 1.

COMPARATIVE EXAMPLES 7-12

Comparative Example 7

Preparation of Cathode Active Material $LiCoO_2$ powder manufactured in Example 1 and $Li_2CO_3$ were mixed in a weight ratio of 100:1. The resulting mixture was pulverized and mixed in a mortar under dry conditions to prepare a cathode active material. The cathode active material consisted of carbonate plus bicarbonate ion concentration of 0.756% by weight, 0.057% by weight of a hydroxyl ion, and 0.038% by weight of a sulfate ion based on the total weight of the cathode active material.

Comparative Example 8

$LiCoO_2$ powder prepared in Example 1 and LiOH were mixed in a weight ratio of 100:1. The resulting mixture was pulverized and mixed in a mortar under dry conditions to prepare a cathode active material. The cathode active material consisted of carbonate ion plus bicarbonate ion concentration of 0.129% by weight 0.702% by weight of a hydroxyl ion, and 0.030% by weight of a sulfate ion based on the total weight of the cathode active material.

Comparative Example 9

$Co_3O_4$ powder which is commercially available, and has an average particle size of 12 μm and a spinel structure was prepared. $Co_3O_4$ powder was mixed with LiOH to form a mixture of Co and Li in a mole ratio of 1:1. The mixture was heated at 850° C. for 15 hours to form $LiCoO_2$ the cathode active material. The $LiCoO_2$ was 0.607% by weight of carbonate plus bicarbonate ion, 0.141 % by weight of hydroxyl ion, and 0.288% by weight of sulfate ion based on the total weight of the cathode active material.

Comparative Example 10

Preparation of Cathode Active Material $Ni_{0.8}Co_{0.2}(OH)_2$, which has an average particle sized of 12 μm and an assembled structure, was prepared by a coprecipitation method. The $Ni_{0.8}Co_{0.2}(OH)_2$ was mixed with LiOH to result in a mixture of a transition metal and lithium in a mole ratio of 1:1. The mixture was heated at 800° C. for 15 hours to form $LiNi_{0.8}Co_{0.2}O_2$, the cathode active material. This material consisted of a carbonate plus bicarbonate ion concentration of 0.877% by weight, 0.187% by weight of hydroxyl ion based on the total weight of the cathode active material.

Comparative Example 11

Preparation of Cathode Active Material

In 30L of an ethanol solution containing 50 mL of acetic acid, 20 kg of $LiNi_{0.8}Co_{0.2}O_2$ as prepared in Comparative Example 10 was dispersed and was then stirred for one hour, filtered, and finally dried under a vacuum resulting in a cathode active material. The cathode active material consisted of 0.814% by weight of carbonate ion plus bicarbonate ion, and 0.053% by weight of hydroxyl ion. Less hydroxyl ion was used in this example than that in Comparative Example 4 because $LiNi_{0.8}Co_{0.2}O_2$ was first washed with the acetic acid.

Comparative Example 12

Preparation of Cathode Active Material $LiNi_{0.8}Co_{0.2}O_2$ powder prepared in Example 2 and LiOH were mixed in a weight ratio of 400:1. The resulting mixture was pulverized and mixed in a mortar under dry conditions to prepare a cathode active material. The cathode active material consisted of 0.241% by weight of carbonate ion plus bicarbonate ion, and 0.207% by weight of hydroxyl ion based on the total weight of the cathode active material.

Assembly of Lithium Batteries for Comparative Examples 7-12

Lithium batteries were prepared using cathode active material manufactured in Comparative Examples 7 through 12 by the same manner as in Example 4.

Experimental Example 1

Measurement of Expansion Rate

Figure 2:
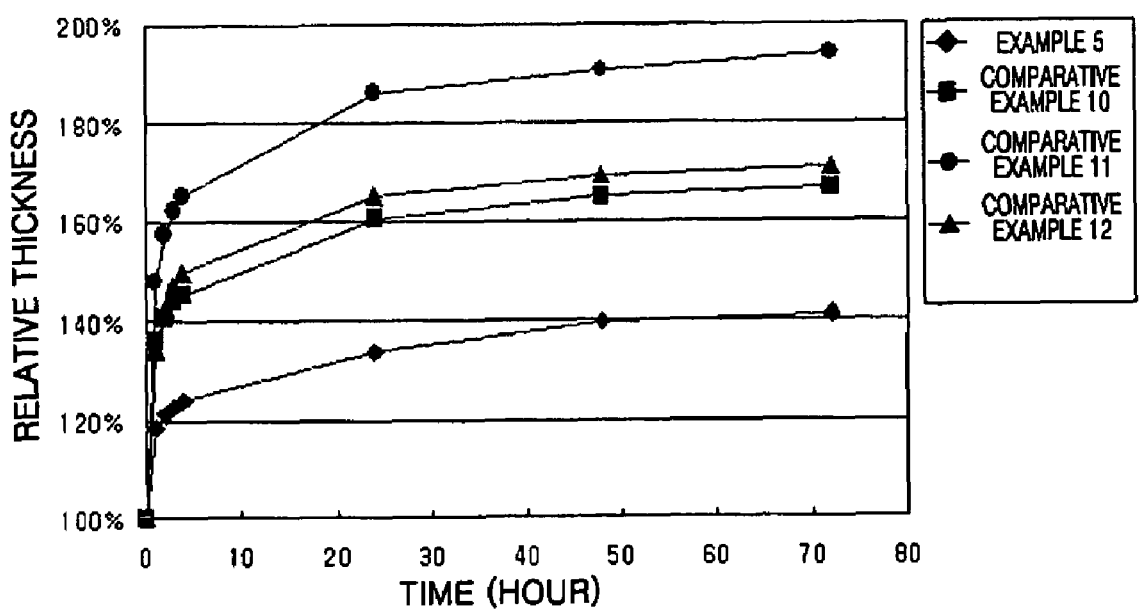
FIG. 2 illustrates the expansion rates of lithium rechargeable batteries according to Example 5 and Comparative Examples 10 through 12.

The lithium batteries with a rectangular shape manufactured in Examples 4 and 6 and Comparative Examples 7 through 9 were charged to 4.2V and then placed at 85° C. to measure the change of battery thicknesses. The results are shown in FIG. 1. In FIG. 1, the Y coordinate represents relative thicknesses percent which is a ratio of a battery thickness before being placed at 85° C. to a battery thickness after being placed at 85° C. The expansion rates of batteries assembled in Examples 5 and Comparative Examples 10 through 12 were measured. The results are shown in FIG. 2. According to FIG. 1, when a carbonate bicarbonate or hydroxyl ion exists in a cathode active material, a battery containing the cathode active material swells largely at high temperatures. In particular, batteries prepared in Comparative Examples 7 and 8 swelled 10.6 times and 7.7 times, respectively, larger than the battery prepared in Example 4 at 85° C. for the initial one hour. These results imply that if a carbonate bicarbonate or hydroxyl ion exists in a cathode active material and the surrounding temperature is high, a battery containing the cathode active material can swell largely very rapidly. On the other hand, as is apparent in the plot of Example 6, the presence of a sulfate ion does not compound to the expansion characteristics at high temperatures. The battery constructed in Comparative Example 9 swells 11.2 times larger than the battery manufactured in Example 4.

Referring to FIG. 2, only if the carbonate plus bicarbonate ions concentration was at most 0.5% by weight and the amount of a hydroxyl ion was at most 0.1% by weight based on the total weight of the cathode active material, a phenomenon in which the battery swells when placed at 85° C. was effectively prevented. As apparent from plots of Comparative Examples 11 and 12, if at least one of those weight fractions is outside of the range, those batteries will swell to 2 times larger than those manufactured according to Examples which were placed at 85° C. for one hour. Accordingly, the swelling of a lithium battery can be substantially suppressed when it sits at 60° C. or more according to the present invention.

As described above, a carbonate ion and hydroxyl ion are oxidized at the cathode, and then components of an electrolytic solution decompose which causes the generation of the gas. Therefore, in a lithium battery containing the cathode active material according to the present invention, a phenomenon in which the lithium battery swells when is placed at 60° C. or more can be significantly improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A cathode active material for a lithium rechargeable battery containing a cathode, an anode, and an electrolytic solution, wherein the cathode active material comprises 0.5% by weight or less of carbonate ion ($CO_3^{2-}$) plus bicarbonate ion ($HCO_3^-$) and 0.1% by weight or less of hydroxyl ion ($OH^-$), wherein the cathode active material is a compound selected from the group consisting of $Li_xMn_{1-y}M'_yA_2$, $Li_xMn_2O_{4-z}X_z$, $Li_xMn_{2-y}M'_yA_4$, $Li_xCo_{1-y}M'_yA_2$, $Li_xCo_{1-y}M'_yO_{2-z}X_z$, $Li_xNi_{1-y-z}Co_yM'_zO_{2-\alpha}X_\alpha$, and $Li_xNi_{1-y-z}Mn_yM'_zO_{2-\alpha}X_\alpha$, where $0.95 \leq x \leq 1.1$, $0 \leq y \leq 0.5$, $0 \leq z \leq 0.5$, $0 < \alpha \leq 2$, M' is at least one element selected from the group consisting of Al, Mn, Cr, Fe, Mg, Sr, V, and a rare earth element, A is selected from the group consisting of O, F, S and P, and X is selected from the group consisting of F, S and P.

2. A lithium rechargeable battery comprising a cathode containing the cathode active material of claim 1, an anode capable of intercalating and deintercalating lithium ions, a separator interposed between the cathode and the anode, and an organic electrolytic solution containing a lithium salt and an organic solvent.

3. The lithium rechargeable battery of claim 2, wherein the separator is made of a material selected from the group consisting of glass fiber, polyester, polyethylene, polypropylene, polytetrafluoroethylene (PTFE), or a mixture thereof.

4. The lithium rechargeable battery of claim 2, wherein the lithium salt is selected from a group consisting of $LiPF_6$, $LiClO_4$, $LiBF_4$, $LiBF_6$, $LiCF_3SO_3$, $LiAsF_6$, $LiC_4F_9SO_3$, $LiN(SO_2CF_3)_2$, $LiN(SO_2C_2F_5)_2$, $LiSbF_6$ or a mixture thereof.

5. The lithium rechargeable battery of claim 2, wherein the organic solvent is selected from a group consisting of ethylene carbonate, propylene carbonate, dimethyl carbonate, diethyl carbonate, ethylmethyl carbonate, methylpropyl carbonate, ethylpropyl carbonate, methylbutyl carbonate, tetrahydrofuran, 2-methyltetrahydrofuran, diethoxyethane, methylformate, ethylformate, triglyme, tetraglyme, fluorobenzene, difluorobenzene, γ-butyrolactone, acetone, acetonitrile, n-methyl-2-pyrrolidone, or the mixture thereof.

6. The lithium rechargeable battery of claim 2, wherein the cathode is formed by coating a mixture of the cathode active material, conductor, binder, and a solvent on an aluminum current conductor and then drying said conductor to form the cathode plate.

7. The lithium rechargeable battery of claim 6, wherein the conductor used to prepare the cathode is selected from the group consisting of carbon black, acetylene black, and Ketjen black.

8. The lithium rechargeable battery of claim 6, wherein the binder used to prepare the cathode is selected from the group consisting of vinylidenefluoride/hexafluoropropylene copolymer, polyvinylidenefluoride, polyacrylonitirile, polymethylmethacrylate, polytetrafluoroethylene, a mixture thereof, and a styrene butadiene rubber (SBR).

9. The lithium rechargeable battery of claim 6, wherein the solvent used to prepare the cathode is selected from the group consisting of N-methylpyrrolidone (NMP), acetone, and water.

10. A lithium rechargeable battery comprising a cathode containing the cathode active material of claim 1, an anode capable of intercalating and deintercalating lithium ions, a separator interposed between the cathode and the anode, and an organic electrolytic solution containing a lithium salt and an organic solvent.

11. The lithium rechargeable battery of claim 10, wherein the separator is made of a material selected from the group consisting of glass fiber, polyester, polyethylene, polypropylene, polytetrafluoroethylene (PTFE), or a mixture thereof.

12. The lithium rechargeable battery of claim 10, wherein the lithium salt is selected from a group consisting of $LiPF_6$, $LiClO_4$, $LiBF_4$, $LiBF_6$, $LiCF_3SO_3$, $LiAsF_6$, $LiC_4F_9SO_3$, $LiN(SO_2CF_3)_2$, $LiN(SO_2C_2F_5)_2$, $LiSbF_6$ or a mixture thereof.

13. The lithium rechargeable battery of claim 10, wherein the organic solvent is selected from a group consisting of ethylene carbonate, propylene carbonate, dimethyl carbonate, d ethyl carbonate, ethylmethyl carbonate, methylpropyl carbonate, ethylpropyl carbonate, methylbutyl carbonate, tetrahydrofuran, 2-methyltetrahydrofuran, diethoxyethane, methylformate, ethylformate, triglyme, tetraglyme, fluorobenzene, difluorobenzene, γ-butyrolactone, acetone, acetonitrile, n-methyl-2-pyrrolidone, or the mixture thereof.

14. The lithium rechargeable battery of claim 10, wherein the cathode is formed by coating a mixture of the cathode active material, conductor, binder, and a solvent on an aluminum current conductor and then drying said conductor to form the cathode plate.

15. The lithium rechargeable battery of claim 14, wherein the conductor used to prepare the cathode is selected from the group consisting of carbon black, acetylene black, and Ketjen black.

16. The lithium rechargeable battery of claim 14, wherein the binder used to prepare the cathode is selected from the group consisting of vinylidenefluoride/hexafluoropropylene copolymer, polyvinylidenefluoride, polyacrylonitirile, polymethylmethacrylate, polytetrafluoroethylene, a mixture thereof, and a styrene butadiene rubber (SBR).

17. The lithium rechargeable battery of claim 14, wherein the solvent used to prepare the cathode is selected from the group consisting of N-methylpyrrolidone (NMP), acetone, and water.

* * * * *

UNITED STATES PATENT AND TRADEMARK OFFICE
CERTIFICATE OF CORRECTION

| | |
|---|---|
| PATENT NO. | : 7,601,462 B2 |
| APPLICATION NO. | : 11/037232 |
| DATED | : October 13, 2009 |
| INVENTOR(S) | : Im et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1304 days.

Signed and Sealed this

Fifth Day of October, 2010

David J. Kappos
*Director of the United States Patent and Trademark Office*